US010179594B2

(12) United States Patent
Li et al.

(10) Patent No.: US 10,179,594 B2
(45) Date of Patent: Jan. 15, 2019

(54) ANTI-POLLUTION-FLASHOVER LOCOMOTIVE ROOF COMPOSITE INSULATOR

(71) Applicant: BEIJING RAILWAY INSTITUTE OF MECHANICAL & ELECTRICAL ENGINEERING CO., LTD, Beijing (CN)

(72) Inventors: Sha Li, Beijing (CN); Guangdan Liu, Beijing (CN); Leren Wang, Beijing (CN); Xiaoqing Shen, Beijing (CN); Jiangfeng Liu, Beijing (CN)

(73) Assignee: BEIJING RAILWAY INSTITUTE OF MECHANICAL & ELECTRICAL ENGINEERING CO., LTD., Beijing (CN)

( * ) Notice: Subject to any disclaimer, the term of this patent is extended or adjusted under 35 U.S.C. 154(b) by 289 days.

(21) Appl. No.: 15/109,738

(22) PCT Filed: Jun. 24, 2014

(86) PCT No.: PCT/CN2014/080614
§ 371 (c)(1),
(2) Date: Jul. 5, 2016

(87) PCT Pub. No.: WO2015/176344
PCT Pub. Date: Nov. 26, 2015

(65) Prior Publication Data
US 2016/0325764 A1 Nov. 10, 2016

(30) Foreign Application Priority Data
May 21, 2014 (CN) .......................... 2014 1 0216996

(51) Int. Cl.
B61C 17/00 (2006.01)
H01B 17/14 (2006.01)
(Continued)

(52) U.S. Cl.
CPC ................ *B61C 17/00* (2013.01); *B61C 3/00* (2013.01); *H01B 17/14* (2013.01); *H01B 17/42* (2013.01); *H02G 3/24* (2013.01)

(58) Field of Classification Search
CPC ........... B61C 3/00; B61C 17/00; H01B 17/42; H02G 3/24
See application file for complete search history.

(56) References Cited

U.S. PATENT DOCUMENTS 4,212,696 A * 7/1980 Lusk ...................... H01B 17/32
156/294
4,373,113 A * 2/1983 Winkler ............ B29C 45/14549
174/179
(Continued)

FOREIGN PATENT DOCUMENTS

CN 2697796 Y 5/2005
CN 2886763 Y 4/2007
(Continued)

OTHER PUBLICATIONS

European Search Report issued in connection with corresponding European patent application No. 14892596.9, dated Jun. 20, 2017, 8 pages.
(Continued)

Primary Examiner — Zachary L Kuhfuss
(74) Attorney, Agent, or Firm — Duane Morris LLP

(57) ABSTRACT

An anti-pollution-flashover locomotive roof composite insulator, comprising: a support body, and several groups of sheds arranged side by side along the axial direction that are set around the sidewall of the support body, wherein the sheds protrude out of the sidewall of the support body along the radial direction, the upper end of the uppermost shed is set with an upper metal fitting, and the lower end of the lowermost shed is set with a lower metal fitting. The creepage distance of the sheds between the upper metal
(Continued)

fitting and the lower metal fitting is 1085 mm-1095 mm, and the arcing distance between the upper metal fitting and the lower metal fitting is 245 mm-255 mm. The insulator employs a long specific creepage distance in terms of structural design, thus providing a good pollution flashover resistance, and under the same pollution condition, a good pollution flashover resistance that is over twice of that of a porcelain insulator with the same creepage distance may be obtained, and hence it is especially applicable for moderate and serious polluted regions.

9 Claims, 1 Drawing Sheet

(51) Int. Cl.
*H01B 17/42* (2006.01)
*B61C 3/00* (2006.01)
*H02G 3/30* (2006.01)

(56) References Cited

U.S. PATENT DOCUMENTS

| | | | | |
|---|---|---|---|---|
| 5,298,301 A * | 3/1994 | Midgley | | H01B 17/32 174/211 |
| 5,830,405 A * | 11/1998 | Mazeika | | B29C 33/005 264/328.2 |
| 6,051,796 A * | 4/2000 | Kuhl | | H01B 17/02 174/177 |
| 6,307,157 B1 * | 10/2001 | Fujii | | H01B 17/12 174/176 |
| 8,319,101 B2 * | 11/2012 | Adachi | | H02G 15/064 174/137 R |
| 8,344,256 B2 * | 1/2013 | Ancilotto | | H01B 17/20 174/158 R |
| 8,717,732 B2 * | 5/2014 | Stenstrom | | H01C 7/126 174/137 R |
| 8,861,165 B2 * | 10/2014 | Kampe | | H01B 17/16 361/118 |
| 9,352,653 B2 * | 5/2016 | Kawasaki | | B60L 9/00 |
| 9,601,240 B2 * | 3/2017 | Hoefner | | H01B 17/14 |
| 9,828,005 B2 * | 11/2017 | Li | | B61C 17/00 |
| 2009/0071684 A1 * | 3/2009 | Zhang | | H02G 15/064 174/73.1 |
| 2016/0325763 A1 * | 11/2016 | Li | | H01B 17/525 |
| 2016/0325764 A1 * | 11/2016 | Li | | H01B 17/14 |

FOREIGN PATENT DOCUMENTS

| | | |
|---|---|---|
| CN | 201051429 Y | 4/2008 |
| CN | 200995630 Y | 1/2009 |
| CN | 102592755 Y | 7/2012 |
| CN | 102779591 A | 11/2012 |
| CN | 103531312 A | 1/2014 |
| DE | 1956930 U | 3/1967 |
| DE | 1956960 U | 3/1967 |
| EP | 0843322 A2 | 5/1998 |
| RU | 2343578 C1 | 1/2009 |
| RU | 2395128 C1 | 7/2010 |

OTHER PUBLICATIONS

International Search Report dated Dec. 31, 2014 , in connection with International patent application No. PCT/CN2014/080614, 4 pages.

* cited by examiner

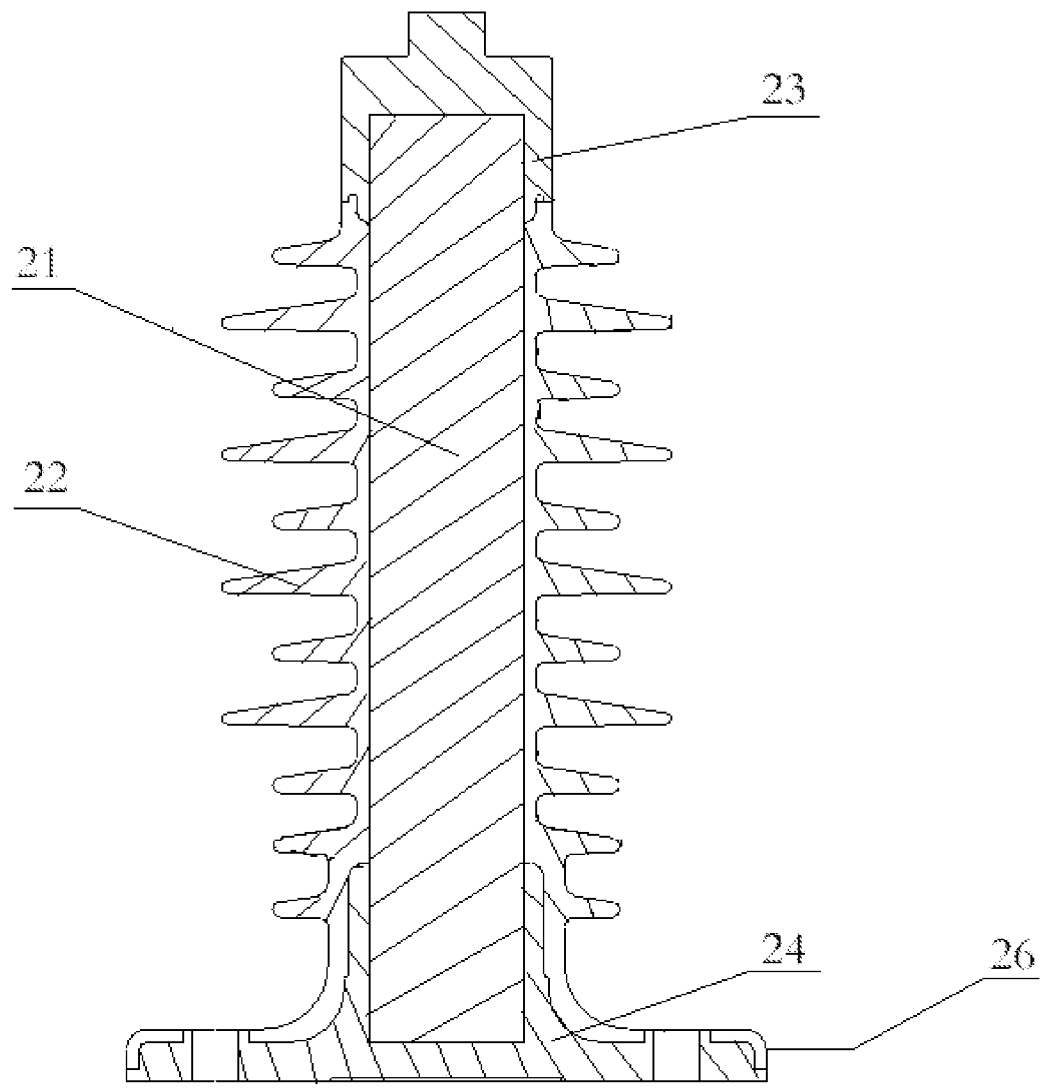

ANTI-POLLUTION-FLASHOVER LOCOMOTIVE ROOF COMPOSITE INSULATOR

CROSS-REFERENCE TO RELATED APPLICATIONS

The present application is a U.S. national stage application under 35 U.S.C. § 371 of PCT Application No. PCT/CN2014/080614, filed Jun. 24, 2014, which claims the benefit of Chinese Patent Application No. 201410216996.X filed by Beijing Railway Institute of Mechanical & Electrical Engineering Co., LTD on May 21, 2014, titled "ELECTRIC MULTIPLE UNIT CAR-ROOF ANTIFOULING FLASH COMPOSITE INSULATOR", the entireties of which are herein incorporated by reference.

TECHNICAL FIELD

The present invention relates to the field of Multiple Units (MUs), and in particular, to an anti-pollution-flashover locomotive roof composite insulator.

TECHNICAL BACKGROUND

Since the first high-speed railway, Japan New Tokkaido Line, was put into operation on Oct. 1, 1964, high-speed MU has been developed increasingly. After more than 40 years' of continuous development, three high-speed MU technical systems represented by Japan New Tokkaido Line, Germany ICE and France TGV have been basically formed. The MU from each country has respective features according to respective actual demands, and they play a positive role in the development of the word's high-speed railway.

France started to research TGV-PSE since 1976, and it was brought into use in September 1981. In May 1990, TGV-A325 reached a running speed of 515.3 km/h on the Atlantic Line, creating a word record of wheel rail system traveling speed. On Apr. 3, 2007, MU V150 tested by France reached a trial speed of 574.8 km/h, creating a new record of high-speed railway.

Federal Railways tried to manufacture an ICE intercity fast test vehicle in August 1982. An ICE/V test high-speed MU, which employed a form of 2 tractors and 3 trailers, was successfully manufactured in 1985, and it reached a trial speed of 317 km/h. In May 1988, ICE/V test train created a speed record of 406.9 km/h in the pathway between Hanoverian and Wuerzburg.

Ministry of Railways of the People's Republic of China purchased high-speed railway vehicle technologies from foreign enterprises such as Bombardier Canada, Kawasaki Heavy Industries, Ltd. Japan, Alstom France and Siemens Germany, etc. and started to develop high-speed trains with a speed of 350 km/h and above by vehicle manufacturing enterprises under China CNR Corporation and China CSR Corporation in a mode of introducing and absorbing overseas advanced technologies since 2004.

As one of the most important devices for vehicle roof line security, the insulator attracts the attention of the operation department and the manufacturing industry of electric locomotives. The fast development of China electric grid accelerates the rapid growth of the composite insulator industry, which brings the Chinese manufacturing technology of silicon rubber composite insulator into a world-leading level.

Generally, the number of composite insulator manufacturing enterprises in China has exceeded 100, but only about 10 of them dominate in the market. In addition, insulator manufacturing enterprises engaging in railway security are even fewer. With the rapid increase of train speed and the wide layout of electrified railways, the operational environment of the locomotive roof insulator is more diversified, and the requirements thereof are stricter. In recent years, insulator flashover and tripping accidents tend to be frequent and serious.

However, in the prior art, the creepage distance of a composite insulator set on a locomotive roof is small, and thus it is difficult to avoid pollution-flashover accidents, and the mechanical strength and the soiling resistance are poor; and also cleaning is often required during operation, and it is especially not applicable for moderate and serious polluted regions.

In view of the above problems, there is a need for providing an anti-pollution-flashover locomotive roof composite insulator, thereby solving the problems of the prior art that the pollution flashover resistance is poor and it is not applicable for moderate and serious polluted regions.

SUMMARY OF THE INVENTION

In an embodiment of the disclosure, it is to provide an anti-pollution-flashover locomotive roof composite insulator. The anti-pollution-flashover locomotive roof composite insulator has a long specific creepage distance and a good pollution flashover resistance, and it is especially applicable for moderate and serious polluted regions.

The disclosure employs the technical solutions below:

An anti-pollution-flashover locomotive roof composite insulator, includes a support body and several groups of sheds arranged side by side along the axial direction that are set around the sidewall of the support body, the sheds protrude out of the sidewall of the support body along the radial direction, the upper end of the uppermost shed is set with an upper metal fitting, and the lower end of the lowermost shed is set with a lower metal fitting, and the creepage distance between the upper metal fitting and the lower metal fitting is 1085 mm-1095 mm, and the arcing distance between the upper metal fitting and the lower metal fitting is 245 mm-255 mm.

Preferably, the creepage distance between the upper metal fitting and the lower metal fitting is 1090 mm, and the arcing distance between the upper metal fitting and the lower metal fitting is 250 mm.

Preferably, a creepage distance-increasing shed is set on the lower metal fitting of the support body.

Preferably, the creepage distance-increasing shed is vulcanized on the lower metal fitting.

Preferably, the support body is a high-strength glass fiber epoxy resin bar.

Preferably, the sheds are located on the outside of a shed housing, and the sheds and the shed housing have an integrated structure.

Preferably, the shed housing is made of a silicon rubber material.

Preferably, the upper end of the support body is provided with an upper metal fitting for connecting a conducting rod, the lower end of the support body is provided with a lower metal fitting for mounting the composite insulator onto a locomotive roof, and the upper end and the lower end of the support body are respectively provided with an upper end opening and a lower end opening, into which the upper metal fitting and the lower metal fitting are respectively inserted thereby being assembled on the two ends of the support body.

Preferably, the upper metal fitting and the lower metal fitting are both made of stainless steel 304.

The disclosure has the beneficial effects below:

The disclosure provides an anti-pollution-flashover locomotive roof composite insulator, which includes a support body and several groups of sheds arranged side by side along the axial direction that are set around the sidewall of the support body, the sheds protrude out of the sidewall of the support body along the radial direction, the upper end of the uppermost shed is set with an upper metal fitting, and the lower end of the lowermost shed is set with a lower metal fitting, the creepage distance between the upper metal fitting and the lower metal fitting is 1085 mm-1095 mm, and the arcing distance between the upper metal fitting and the lower metal fitting is 245 mm-255 mm. The insulator employs a long specific creepage distance in terms of structural design, thus providing a good pollution flashover resistance, and under the same pollution condition, a good pollution flashover resistance that is over twice of that of a porcelain insulator with the same creepage distance may be obtained, and hence it is especially applicable for moderate and serious polluted regions.

DESCRIPTION OF DRAWINGS

FIG. 1 is a sectional view of a anti-pollution-flashover locomotive roof composite insulator according to a device embodiment of the invention.

Wherein:

21: Support Body; 22: Shed; 23: Upper Metal Fitting; 24: Lower Metal Fitting; 26: Creepage Distance-Increasing Shed.

DETAILED DESCRIPTION OF THE PREFERRED EMBODIMENT

The technical solutions of the invention will be further illustrated in detail below in conjunction with the drawings and specific embodiments.

FIG. 1 is sectional view of an anti-pollution-flashover locomotive roof composite insulator according to a device embodiment of the invention. As shown in FIG. 1, the anti-pollution-flashover locomotive roof composite insulator includes a support body 21 and several groups of sheds 22 arranged side by side along the axial direction that are set around the sidewall of the support body 21, the sheds 22 protrude out of the sidewall of the support body 21 along the radial direction, an upper metal fitting 23 is set on the upper end of the uppermost shed 22, and a lower metal fitting 24 is set on the lower end of the lowermost shed 22, the creepage distance of the sheds 22 between the upper metal fitting 23 and the lower metal fitting 24 is 1085 mm-1095 mm, and the arcing distance between the upper metal fitting 23 and the lower metal fitting 24 is 245 mm-255 mm.

In this embodiment, more preferably, the creepage distance between the upper metal fitting 23 and the lower metal fitting 24 is 1090 mm, and the arcing distance between the upper metal fitting 23 and the lower metal fitting 24 is 250 mm.

In this embodiment, a long specific creepage distance (1090 cm/25 kV) is employed in the structural design, so that under the same pollution condition, a good pollution flashover resistance that is over twice of that of a porcelain insulator with the same creepage distance may be obtained.

In this embodiment, four shed groups 22 located on the upper end are respectively consisted of one large shed and one small shed, and one shed group 22 located on the lowermost end is consisted of two small sheds.

In this embodiment, the support body 21 is a high-strength glass fiber epoxy resin bar.

The support body 21 is the framework of the composite insulator. Since a high-strength glass fiber epoxy resin bar is employed as the support body 21 in this embodiment, a high flexural resistance can be obtained, and the flexural resistance is greater than 16 kN.

The novel material is formed by winding glass fiber soaked with epoxy resin at a high temperature, and under the mechanical stress, the electric stress and the chemical action of sulphur hexafluoride and the resolvents thereof at the same time, the moisture in the atmosphere may enter due to design deficiency and quality defect, etc., so that the glass fiber-enhanced epoxy resin tube may be deteriorated. Moreover, the expansion coefficient of the glass fiber-enhanced epoxy resin tube approaches zero, and the expansion coefficient of the metal accessories is $0.26 \times 10^{-6}$, and hence the difference therebetween is very small. However, gas seizes every opportunity. In order to guarantee the reliability and security of the insulator during long-term outdoor operation, it should ensure reliable interface joint and sealing between the end accessories, the glass fiber-enhanced epoxy resin tube and the shed housing in designing and manufacturing.

In this embodiment, the upper end of the support body 21 is provided with an upper metal fitting 23 for connecting a conducting rod, and the upper metal fitting 23 is assembled on the upper end of the support body 21 via annular crimping connection by a dedicated device.

Moreover, the lower end of the support body 21 is provided with a lower fitting 24 for mounting the composite insulator onto the locomotive roof, and the lower fitting 24 is assembled on the lower end of the support body 21 via annular crimping connection by a dedicated device.

Specifically, the upper end and the lower end of the support body 21 are respectively provided with an upper end opening and a lower end opening, into which the upper metal fitting 23 and the lower metal fitting 24 are respectively inserted and thereby assembled on the two ends of the support body 21.

In this embodiment, since the metal fittings located on the upper and lower ends of the support body 21 are both assembled via annular crimping by a dedicated device, the composite insulator is bending-resistant and tight, and has a good shock resistance, impact resistance and brittle failure resistance, the bending resistance thereof is greater than 16 kN, and it can operate under various climates, operating conditions and environments.

In this embodiment, preferably, the upper metal fitting 23 is made of stainless steel 304.

In this embodiment, preferably, the lower metal fitting 24 is also made of stainless steel 304.

In this embodiment, preferably, the shed 22 is located on the outside of the shed housing. In order to eliminate the hidden danger to internal insulation due to bonding and improve the internal insulating strength, the shed 22 and the shed housing should be formed integrally.

In this embodiment, preferably, the sheds 22 is made of a silicon rubber material.

The silicon rubber has the characteristics of low surface energy, high hydrophobicity and hydrophobic mobility, etc., thus having a very good pollution flashover resistance. The number of carbon atoms in the molecule of silicon rubber is less than that of an organic polymer, thus having a very good arc resistance and electric leakage resistance. Additionally, even if the silicon rubber is burned, it would form insulating silicon, thus having an excellent electric insulativity.

Due to the high bond energy and good chemical stability of the silicon rubber, it has a better heat tolerance than organic polymers. Moreover, due to the poor inter-molecule interaction force, the vitrification temperature is low, and the cold tolerance is good. Therefore, the characteristics will not be changed no matter where it is used. Because a methyl group is present on the surface of polysiloxane, it has hydrophobicity, thereby using in waterproof. The insulator employs a high-quality silicon rubber as its external insulating material, and hence it has acid resistance, alkali resistance and saline resistance, and has excellent atmosphere aging resistance and ultraviolet aging resistance. It has a good temperature practicability and a high-temperature resistance, and may work at 100° C.; moreover, it has a low-temperature resistance, and may still keep elasticity at −60° C.

In this embodiment, for the problem of discharging between the lower shed edge of the locomotive roof composite insulator and the lower metal fitting 24 thereof under an extreme climate, if the creepage distance still needs to be increased, a creepage distance-increasing shed 26 may be provided on the lower metal fitting 24 of the lower end of the support body 21.

The arcing distance and the insulator creepage distance can be increased greatly without adding the height of the insulator, thus solving the problem of discharging the lower shed edge of the insulator on the base plate, and hence the insulator has a bigger insulation margin, and is more secure and reliable.

In this embodiment, preferably, the creeping distance increasing shed 26 has a separate structure with the lower metal fitting 24, and is mounted to the lower metal fitting 24 during operation; however, the steep wave test will not be affected if creeping distance increasing shed 26 is not included in the original configuration. More preferably, the creepage distance-increasing shed 26 is made of a thermal shrinkage material.

In this embodiment, preferably, the creepage distance-increasing shed 26 is directly vulcanized on the lower metal fitting 24.

In this embodiment, preferably, the diameter of the creepage distance-increasing shed 26 is 80 mm-90 mm.

The insulator has the advantages of light mass, small volume, easy transportation and installation, high mechanical strength and good soiling resistance; and it is also free-cleaning and without preventative test during operation, thus avoiding pollution flashover accident so that it is especially applicable for moderate and serious polluted regions. In addition, a creepage distance-increasing shed is used in the disclosure, so that the arcing distance of the insulator is effectively prolonged without adding the height of the insulator, and hence it is a novel insulator totally different from porcelain insulators in terms of the material and the structure. It has the advantages of reasonable structure and good high-speed performance. The insulator has passed the 380 km/h wind-tunnel test made by the Low-Speed Aerodynamic Research Institute of China Aerodynamic Research & Development Center, so that it is applicable for CRH3 series EMU group.

The technical principles of the invention have been described above in conjunction with specific embodiments. These descriptions are only used for explaining the principles of the invention, rather than limiting the protection scope of the invention in any way. Based on the explanation, one skilled the art may obtain other specific embodiments of the invention without creative work, and these embodiments all fall into the protection scope of the invention.

The invention claimed is:

1. A anti-pollution-flashover locomotive roof composite insulator, comprising: a support body, and a plurality of groups of sheds arranged side by side along an axial direction that are set around a sidewall of the support body; the sheds protrude out of the sidewall of the support body along a radial direction, an upper end of an uppermost shed is set with an upper metal fitting, and a lower end of a lowermost shed is set with a lower metal fitting, wherein, a creepage distance of the sheds between the upper metal fitting and the lower metal fitting is 1085 mm-1095 mm, and an arcing distance between the upper metal fitting and the lower metal fitting is 245 mm-255 mm, wherein the plurality of groups of sheds comprise one group of sheds located on a lower end of the support body, and four groups of sheds located above the one group of sheds, the one group of sheds comprises two small sheds, and the four groups of sheds each comprise one large shed and one small shed.

2. The anti-pollution-flashover locomotive roof composite insulator according to claim 1, wherein, the creepage distance of the sheds between the upper metal fitting and the lower metal fitting is 1090 mm, and the arcing distance between the upper metal fitting and the lower metal fitting is 250 mm.

3. The anti-pollution-flashover locomotive roof composite insulator according to claim 1, wherein, a creepage distance-increasing shed is set on the lower metal fitting.

4. The anti-pollution-flashover locomotive roof composite insulator according to claim 3, wherein, the creepage distance-increasing shed is vulcanized on the lower metal fitting.

5. The anti-pollution-flashover locomotive roof composite insulator according to claim 1, wherein, the support body is a high-strength glass fiber epoxy resin bar.

6. The anti-pollution-flashover locomotive roof composite insulator according to claim 1, wherein, the sheds are located on outside of a shed housing, and the sheds and the shed housing have an integrated structure.

7. The anti-pollution-flashover locomotive roof composite insulator according to claim 6, wherein, the shed housing is made of a silicon rubber material.

8. The anti-pollution-flashover locomotive roof composite insulator according to claim 1, wherein, the upper metal fitting is configured for connecting a conducting rod, the lower metal fitting is configured for mounting the composite insulator onto a locomotive roof, and an upper end and a lower end of the support body are respectively provided with an upper end opening and a lower end opening, into which the upper metal fitting and the lower metal fitting are respectively inserted, thereby being assembled on the two ends of the support body.

9. The anti-pollution-flashover locomotive roof composite insulator according to claim 8, wherein, the upper metal fitting and the lower metal fitting are both made of stainless steel 304.

* * * * *